United States Patent [19]
Barry

[11] 3,710,972
[45] Jan. 16, 1973

[54] ELECTRIC OUTLET BOX MOUNTING

[76] Inventor: Robert Lionel Barry, 2916 East Randolph Road, Silver Spring, Md. 20904

[22] Filed: Jan. 26, 1971

[21] Appl. No.: 109,910

[52] U.S. Cl..................................220/3.6, 174/58
[51] Int. Cl. .............................................H02g 3/08
[58] Field of Search......220/3, 6, 18; 248/27, DIG. 6; 174/58

[56] References Cited

UNITED STATES PATENTS

| | | | |
|---|---|---|---|
| 1,328,968 | 1/1920 | Russell | 220/3.6 UX |
| 1,662,422 | 3/1928 | Hodges | 220/3.6 UX |
| 2,063,923 | 12/1936 | Gries | 220/3.6 |
| 2,286,898 | 6/1942 | Cover | 220/3.6 |
| 2,769,562 | 11/1956 | Rudolph | 220/3.6 |
| 2,842,281 | 7/1958 | Chisholm | 220/3.6 |
| 3,361,089 | 1/1968 | Fischer et al. | 220/3.6 X |
| 3,620,401 | 11/1971 | Lund | 220/3.6 |

Primary Examiner—Donald F. Norton
Assistant Examiner—James R. Garrett
Attorney—John N. Randolph

[57] ABSTRACT

An electric box outlet with improved mounting means enabling the mounting of the box in an opening of a wall without the use of tools or fastenings, and with the open front of the box disposed flush with the front face of the wall, irrespective of the thickness of the wall. The mounting means includes a pair of mounting elements for engaging the front face of the wall and a second pair of mounting elements for engaging the rear face of the wall, and which last mentioned mounting elements are adjustable longitudinally of the box to compensate for variations in the thickness of walls. Said adjustable mounting elements are capable of being retracted to enable the box to be removed from a wall opening, without damage thereto, and so that the box can be reused.

4 Claims, 5 Drawing Figures

PATENTED JAN 16 1973 3,710,972
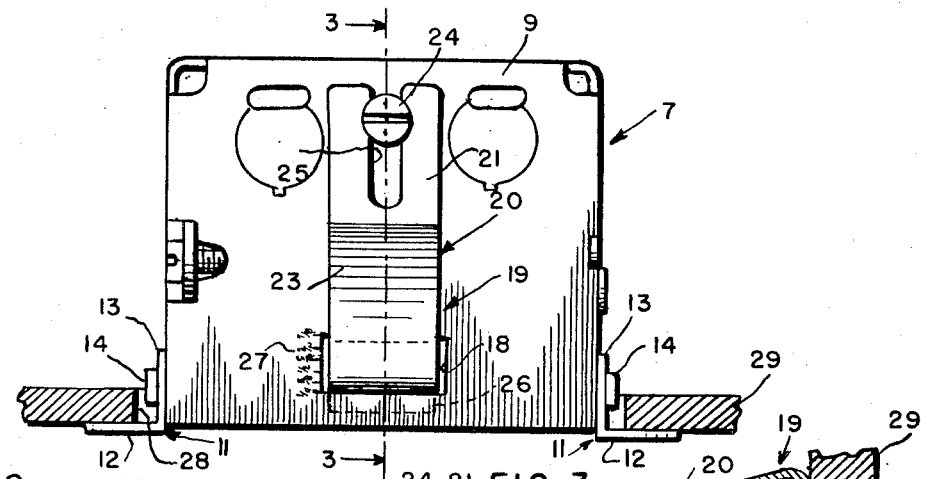
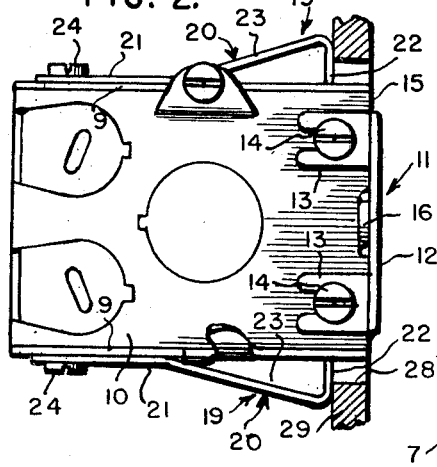
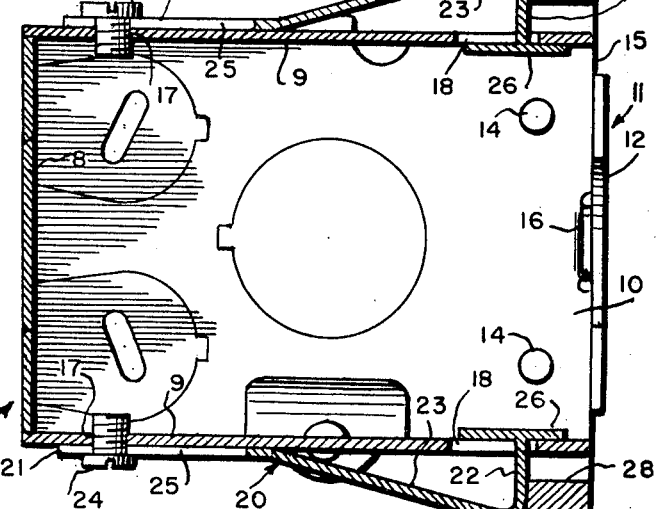
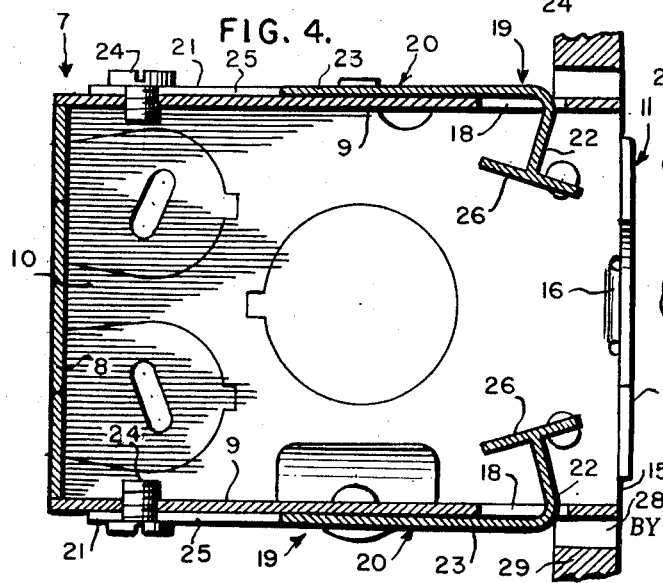
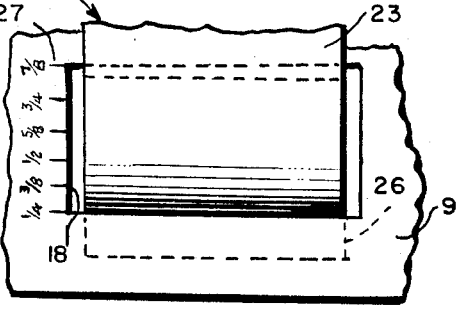
INVENTOR
ROBERT LIONEL BARRY
BY *John N. Randolph*
ATTORNEY

ELECTRIC OUTLET BOX MOUNTING

SUMMARY

It is a primary object of the present invention to provide an improved mounting for electric outlet boxes, enabling such boxes to be mounted in openings of walls of different thicknesses and with the open front of the box always disposed flush with the front face of the wall, as required by building and electrical codes.

Another object of the invention is to provide an electric outlet box mounting including elements for engagement with the rear side of a wall and which are capable of being retracted out of engagement with the wall, to enable removal of the box from the wall opening without damage thereto and so that the box can be reused.

More particularly, it is an object of the invention to provide a pair of resilient mounting elements for application to an otherwise conventional electric outlet box and which elements may be adjustably positioned longitudinally of the box for engagement with the rear side of a wall, in an opening of which the box is mounted, and for cooperation with conventional mounting elements which engage the front side of the wall, to retain the box in the wall opening with its open front flush with the front face of the wall, irrespective of the wall thickness.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a top plan view of the electric outlet box;

FIG. 2 is a side elevational view thereof, looking from left to right of FIG. 1;

FIG. 3 is a sectional view taken substantially along a plane as indicated by the line 3—3 of FIG. 1;

FIG. 4 is a view taken along the same plane as FIG. 3 and illustrating an alternate position of certain of the parts, and FIG. 5 is an enlarged fragmentary plan view of a portion of the box as seen in FIG. 1.

DESCRIPTION OF THE PREFERRED EMBODIMENT

Referring more specifically to the drawing, the electric outlet box in its entirety is designated generally 7 and includes a rear wall 8, a pair of opposite corresponding side walls 9 and a second pair of opposite corresponding side walls 10.

A mounting element 11 is mounted on the exterior of each side wall 10, remote from the rear wall 8, and includes a flange or plate 12 which extends outwardly from said wall 10, as seen in FIG. 1, and a pair of bifurcated members 13 which are disposed at right angles to the flange 12 and which lie against the outer side of the wall 10 and are adjustably secured thereto by screw fastenings 14. The screw fastenings 14 engage through the slots of the members 13 to enable the element 11 to be adjusted lengthwise of the box 7, when the fastenings 14 are loosened, for positioning the flange 12 with its inner side substantially flush with the open front end 15 of the box 7, for a purpose which will hereinafter be described. The walls 10 are each provided at the open end 15 of the box with an outturned ear 16 having a tapped opening. The parts of the box 7 as previously described are all of conventional construction and the openings of the ears 16 are adapted to receive screw fastenings, not shown, for attaching a cover plate, not shown, to the box 7 for closing its open front 15.

The box is modified to the extent that each wall 9 is provided with a tapped opening 17, adjacent the rear wall 8, and a rectangular opening 18, adjacent the open front 15.

A mounting element 19, a pair of which is utilized, constitutes the novel feature of the box 7 and the improvement of the present invention. Each mounting element 19 includes an elongated strip 20 of spring steel having a bifurcated end 21 which bears against the outer side of one of the walls 9 and which is disposed longitudinally of the box 7, an opposite end portion 22 which is disposed approximately at a right angle to the end 21 and which extends inwardly through the opening 18 of said wall 9, and an intermediate portion 23 which extends between an inner end of the end portion 21 and an inner end of the end portion 22 and which is disposed at an obtuse angle to the end 21 and at an acute angle to the end 22.

A headed screw 24 extends through the slot 25 of the end 21 and threadedly engages the opening 17 of said wall 9 for adjustably securing the end 21 to the outer side of the wall 9 and longitudinally of the box 7. The intermediate portion 23 extends outwardly at an incline from said wall 9 and, as previously stated, the end 22 extends inwardly through the opening 18. A plate 26, forming a closure member, is secured to the distal end of the portion 22 and is disposed at a right angle thereto. The plate 26 normally bears against the inner side of said wall 9 for closing or substantially closing the opening 18 thereof.

The outer side of each wall 9, along one side of the opening 18 thereof, is provided with a linear scale 27, as seen in FIG. 5, having graduations spaced apart an eighth of an inch. In FIGS. 1 and 5, the abutment portion 22 of the mounting element 19, which is shown, is positioned in alignment with the ⅜ inch graduation, and it will be understood that the abutment portion 22 of the other mounting element 19 will be disposed in the same position, as illustrated in FIG. 3, for mounting the box 7 in an opening 28 of a wall 29 which is ⅜ of an inch thick. The mounting elements 19 are adjusted to assume these positions by loosening the screws 24 and moving the elements 19 to their positions of FIGS. 2 and 3, after which the screws 24 are tightened for clamping the ends 21 between the screwheads and the walls 9. It will also be readily apparent that the mounting elements 19 can be adjusted in the aforedescribed type manner to accommodate the box to walls of various thicknesses. After the mounting elements 19 have been properly adjusted and clamped in adjusted positions, the box 7 is inserted from right to left of FIGS. 2 and 3 through the opening 28. The portions 20 by contact with the wall 29, around the opening 28, will be deflected inwardly to pass through said opening, or the plates 26 can be held between the thumb and index finger in the positions as seen in FIG. 4 while the box 7 is being passed inwardly through the opening 28 and until the flanges 12 contact the front face of the wall 29, as seen in FIG. 1. The plates 26 are then released to allow the mounting elements 19 to assume their positions of FIGS. 1, 2 and 3, with the portions 22 abutting the rear face of the wall 29, for mounting the box 7 in the wall opening 28.

It will also be apparent that the plates 26 can be engaged and displaced toward one another from their positions of FIG. 3 to their positions of FIG. 4 to enable the box 7 to be removed from the wall 29 without damage to any part of the box so that it can be reused.

It will be understood that the mounting elements 19 can be mounted on various other types of electrical boxes including junctions boxes and switch boxes of various sizes and shapes and on either top and bottom or side walls thereof, and even, if desired, on the same walls as the mounting flanges 12.

Various other modifications and changes are contemplated and may be resorted to, without departing from the function or scope of the invention.

I claim as my invention:

1. An electric outlet box for mounting in a wall opening including first mounting elements adapted to abut against a front face of a support wall through an opening of which the box extends, second mounting elements adjustably anchored to the exterior of the box, said second mounting elements including abutment portions normally disposed externally of the box and substantially parallel to said first mounting elements and adapted to engage the rear face of the wall for securing the box in the opening thereof and resilient portions disposed externally of the box and carrying said abutment portions, said resilient portions being inclined away from the box from said anchoring means for yieldably retaining the abutment portions externally of the box and in wall engaging positions, said resilient portions being displaceable inwardly toward the box for disengaging the abutment portions from the wall and for positioning said abutment portions for passage through the wall opening, said box being substantially closed except for the openings through which the abutment portions extend, and closure and stop elements carried by the abutment portions for limiting outward movement of the abutment portions by engagement with the interior of the box and for closing said box openings when the abutment portions are in wall engaging positions.

2. An electric box as in claim 1, each of said second mounting elements comprising an elongated resilient strip having a bifurcated end bearing against a portion of the exterior of the box, and a clamping screw engaging through said bifurcated end and threadedly engaging in the box, said clamping screw and bifurcated end constituting said adjustable anchoring means.

3. An electric box as in claim 1, said box openings being elongated in a direction longitudinally of said second mounting elements for accommodating adjustment of the abutment portions depthwise of the box for varying the spacing between said abutment portions and said first mounting elements to accommodate walls of different thicknesses.

4. An electric box as in claim 3, and said closure and stop elements being of a dimension depthwise of the box greater than the depthwise length of said openings.

* * * * *